United States Patent [19]

Larson

[11] 3,712,608
[45] Jan. 23, 1973

[54] APPARATUS FOR STACKING SHEETS
[75] Inventor: Charles L. Larson, Grants Pass, Oreg.
[73] Assignee: Jeddeloh Bros., Sweed Mills Inc., Gold Hill, Oreg.
[22] Filed: May 21, 1971
[21] Appl. No.: 145,747

[52] U.S. Cl. ................... 271/68, 214/6 DK, 271/71
[51] Int. Cl. ........................................... B65h 29/34
[58] Field of Search .............. 271/68, 71, 67, 77, 78; 214/6 DK

[56] References Cited

UNITED STATES PATENTS

| | | | |
|---|---|---|---|
| 3,126,657 | 3/1964 | Hajos | 271/71 UX |
| 3,420,386 | 1/1969 | Morrow et al. | 271/68 X |
| 1,688,219 | 10/1928 | Williams | 271/68 |
| 3,358,853 | 12/1967 | Thomas et al. | 271/71 X |
| 3,532,230 | 10/1970 | Gutberlet et al. | 214/6 DK |

Primary Examiner—Evon C. Blunk
Assistant Examiner—Bruce H. Stoner, Jr.
Attorney—Kolisch, Hartwell & Dickinson

[57] ABSTRACT

Stacking apparatus for automatically transferring sheets from a conveyor into a stack. Sheets to be stacked sequentially are moved up an elevator conveyor into engagement with the lower runs of a series of transfer conveyor belts that collectively form a transfer conveyor. Stacking bars, each having a plurality of rollers journaled thereon, are provided below the transfer conveyor. One bar is positioned beneath each end of a given sheet, with the rollers engaging the underside of the sheet to retain it against an adjacent belt of the transfer conveyor for movement therewith. Each bar is attached at its ends to a pair of movable, endless chains that are spaced apart, one on either side of the stack to be formed. The endless chains are supported on sprockets to transfer orbital paths, and are selectively movable whereby a bar is retained beneath a sheet until it is positioned over the stack, whence the bar is moved outwardly beyond the end of a sheet whereby the sheet drops upon the top of the stack.

3 Claims, 5 Drawing Figures

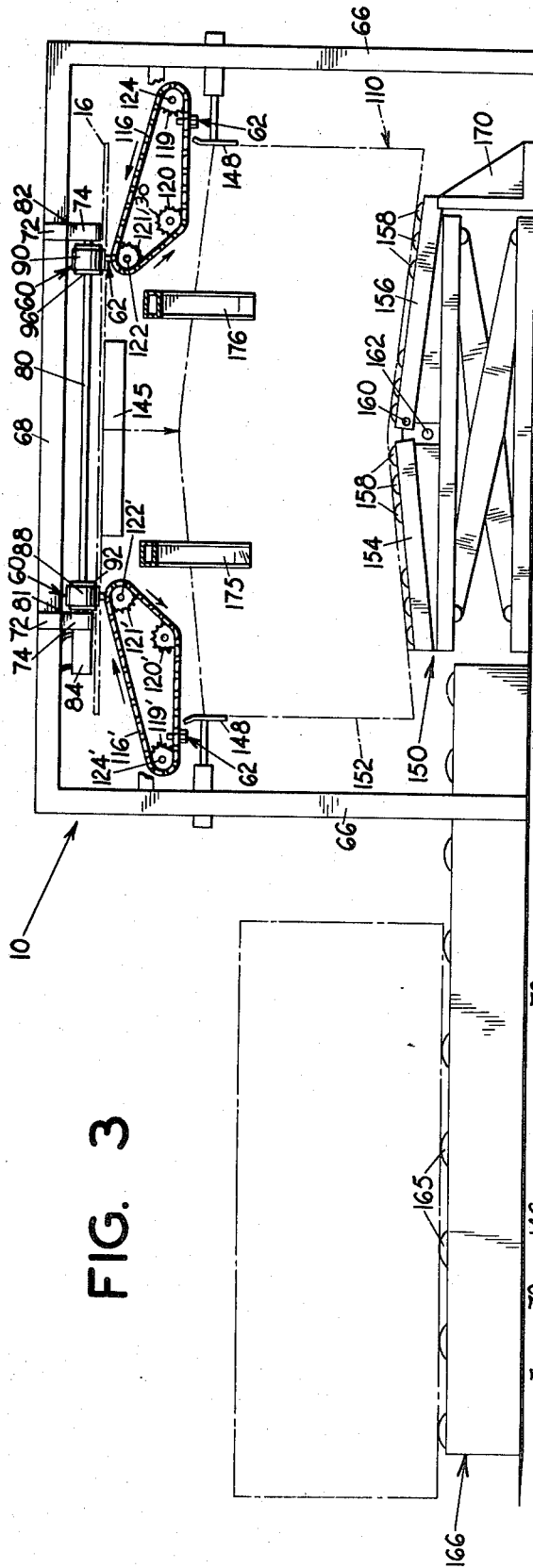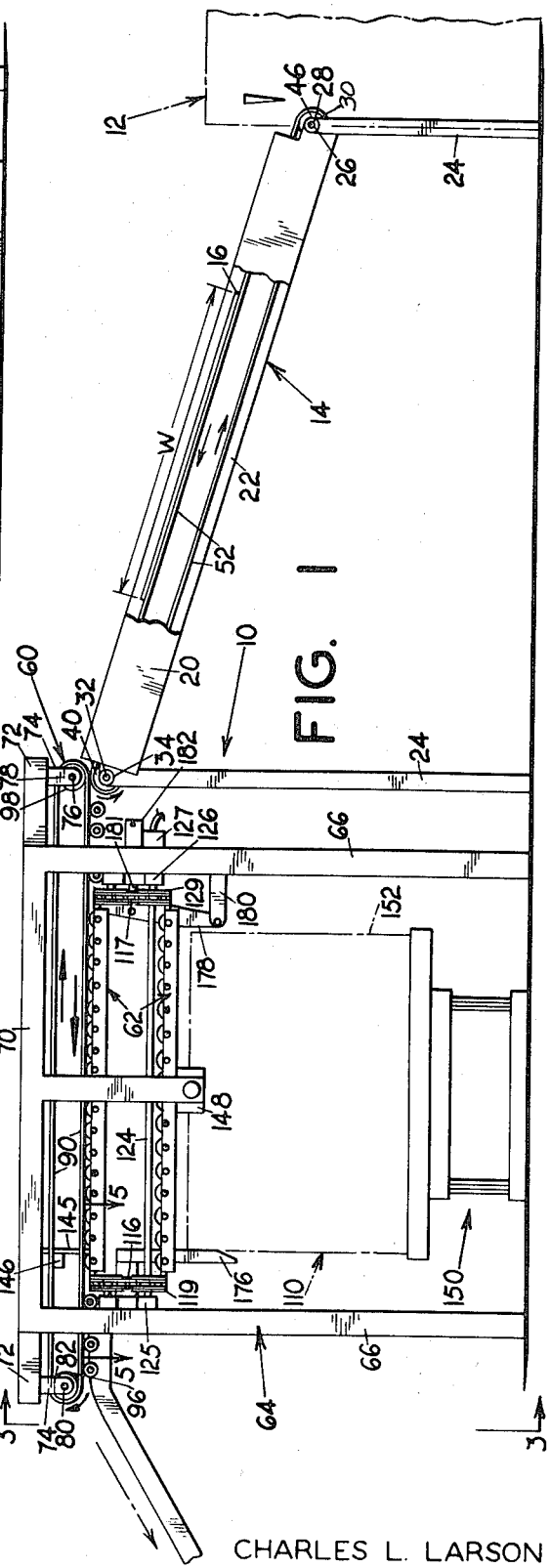

PATENTED JAN 23 1973
3,712,608
SHEET 2 OF 2
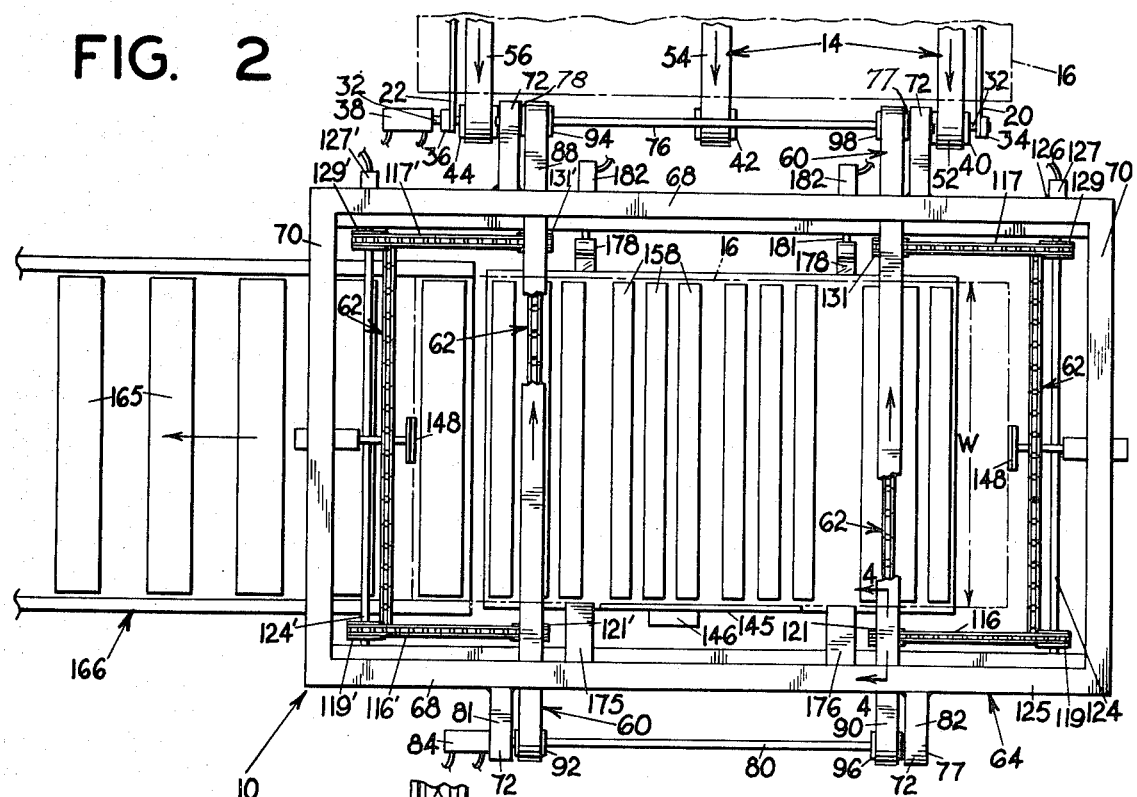
FIG. 2
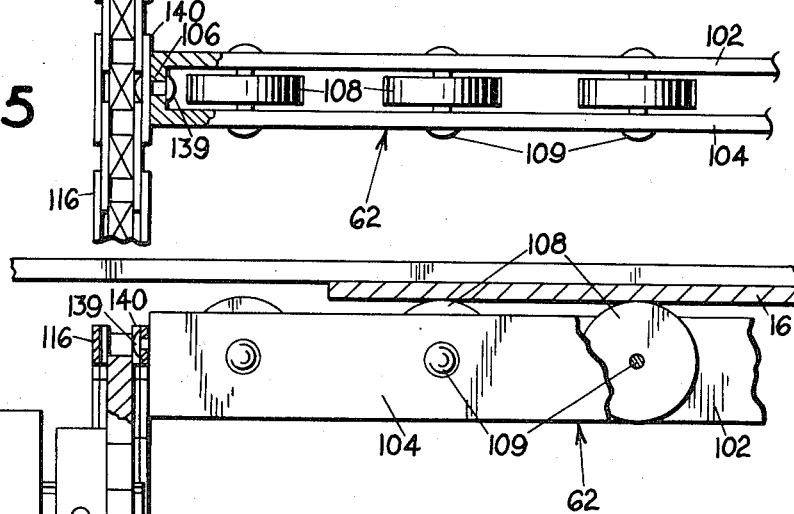
FIG. 5
FIG. 4
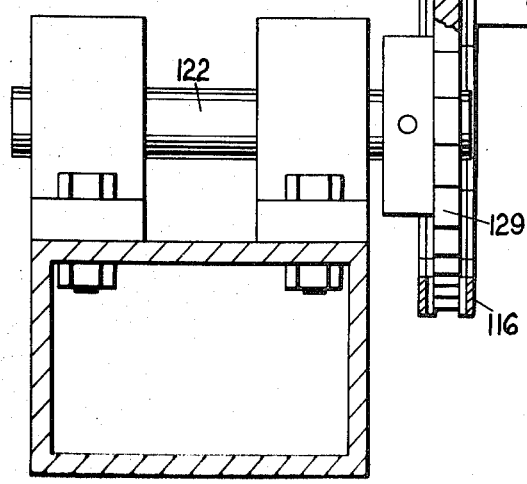
CHARLES L. LARSON
INVENTOR.
BY Kolisch, Hartwell + Dickinson
ATTY.

APPARATUS FOR STACKING SHEETS

BACKGROUND OF THE INVENTION

The invention relates to apparatus for transferring sheets of material into a stack. More particularly the invention concerns apparatus for rapidly handling thin sheets of material such as wood or veneer sheets, and for transferring such sheets into a stack with the edges of the sheets in vertical alignment with the stack.

Various stacking machines have been used in the prior art, particularly in the lumber industry. However, most such machines are objectionable since they do not provide sufficient support for thin sheets and they tend to scratch or bend the sheets being handled. In addition, some of the stacking machines are not capable of handling rapidly the sheets to be stacked and are therefore unsuitable for use in automated systems. Some stacking machines known in the prior art are also undesirable in that they do not permit sorting of the sheets into different stacks.

SUMMARY OF THE INVENTION

Accordingly, it is an object of the present invention to provide a sheet stacking apparatus that overcomes the disadvantages of prior art machines.

It is another object of the invention to provide an automatic sheet stacking apparatus that handles sheets conveyed at high speed and places them in a neat stack.

It is a further object of the invention to provide improved stacking apparatus capable of transferring sheets into neat stacks without marring or damaging the sheets.

It is yet another object of the invention to provide sheet stacking apparatus that enables the sorting of sheets into different stacks, if desired.

The foregoing and other objects of the invention are attained in a stacking apparatus wherein the sheets to be stacked are projected sequentially up an elevator conveyor into engagement with a movable belt on the underside of a transfer conveyor. Stacking bars, each having multiple rollers journaled thereon, are provided below the transfer conveyor with one bar being positioned beneath each end of a given sheet so that the rollers engage the underside of the sheet and retain the sheet against the belt to provide sufficient friction for movement of the sheet by the belt. Each bar is attached at its ends to one of a pair of movable endless chains that are spaced apart, one in each side of the stack being formed. The endless chains are supported on drive sprockets and adapted for movement, selectively, along orbital paths that move the stacking bars with respect to the sheet.

In a stacking cycle, the rollers on the stacking bars retain a given sheet against the transfer conveyor until the sheet is aligned over the stacking platform. The endless chains are then actuated so that the bars are lowered and moved beyond the ends of the sheet whereby the sheet drops upon the top of the stack. The bars are subsequently moved on around the orbital path to their original position where they are adapted to engage the ends of another sheet entering the apparatus if the cycle is to be repeated. Two sets of stacking bars can be provided on each set of chains to double the sheet handling capacity of the apparatus. A retractable stop can be provided in the path of the sheets for selectively stopping the sheets over the desired stack or, when retracted, permitting the sheets to move along the conveyor to another station, such as a reject station.

BRIEF DESCRIPTION OF THE DRAWINGS

Other objects and advantages of the invention will become apparent from the following detailed description of the invention, taken in conjunction with the accompanying drawings, wherein:

FIG. 1 is an end elevation view of one preferred embodiment of the stacking apparatus;

FIG. 2 is a top view of the apparatus illustrated in FIG. 1;

FIG. 3 is a side elevation view of the apparatus illustrated in FIGS. 1 and 2;

FIG. 4 is an enlarged fragmentary view taken along lines 4—4 in FIG. 2; and

FIG. 5 is an enlarged fragmentary view taken along lines 5—5 in FIG. 1.

DETAILED DESCRIPTION OF THE INVENTION

Referring now to the drawings, one preferred embodiment of the invention is illustrated in the form of a stacking apparatus 10 particularly adapted for handling thin sheets such as veneer sheets. However, it should be realized that the stacking apparatus disclosed could be used for handling other sheet material without departing from the scope of the invention.

Stacking apparatus 10 is arranged to receive and handle sheets furnished sequentially from a separate source, such as a veneer clipper diagrammatically illustrated at 12. The veneer clipper is of conventional design and is adapted to produce sheets of veneer that are cut to a predetermined uniform width, such as a width of four feet. The apparatus could be designed for handling sheets of other sizes however.

The sized sheets are projected from the clipper in a direction transverse to the trimmed edges of the sheets and are received upon an elevator conveyor 14. A typical sheet 16 is illustrated on the elevator conveyor with the narrow or trimmed width indicated by the dimension W.

Elevator conveyor 14 includes a frame 18 comprised of opposed side members 20, 22 that are supported by legs 24. The members of the frame are constructed of conventional materials, such as channel iron, and are secured together by suitable means such as bolted or welded joints. A lower shaft 26 generally extends between side members 20, 22 at the lower end of the frame, with the shaft being rotatably supported in bearings 28, 30 secured, respectively, to side members 20, 22. An upper shaft 32 is also provided, extending between side members 20, 22 at the upper end of the frame. The ends of shaft 32 are rotatably supported in bearings 34, 36 secured to the side members. A motor 38 is mounted on side member 22 having its shaft connected with one end of shaft 32 for driving the latter in the direction indicated. Drive rollers 40, 42, 44 are secured on shaft 32 and idler rollers 46, 48, 50 are secured to shaft 26, with the corresponding rollers being laterally spaced at corresponding distances. An endless belt 52 is supported on rollers 40, 46 with the upper reach of the belt adapted for movement in the direction shown by the arrow upon rotation of the upper shaft. An endless belt 54 is similarly supported on rollers 42, 48 and an endless belt 56 is supported on rollers 44, 50. The belts are driven continuously and in unison to advance sheets, such as sheet 16, up the elevator conveyor. Belts 52, 54, 56 can be provided with risers to engage and hold the sheets if desired. However, the incline of the elevator is slight and this has not been found to be necessary.

As sheets 16 are advanced to the upper end of conveyor 14, they move off the conveyor into engagement with the lower runs of belts provided in a transfer conveyor 60. A sheet is retained in contact with the belts by stacking bars 62.

Transfer conveyor 60 is suspended from a frame generally indicated at 64, comprising legs 66, upper side members 68 and cross members 70. The frame further includes extensions 72 having support plates 74 secured thereto in depending relationship as best illustrated in FIG. 1. A first shaft 76 is rotatably mounted on one side of the framework in bearings 77, 78 secured to plates 74. A second shaft 80 is rotatably mounted on the other side of the framework in bearings 81, 82 secured to a corresponding set of plates 74. A motor 84 is secured to the frame having its shaft attached to one end of shaft 80 for driving the shaft.

The transfer conveyor further includes an endless belt 88 and an endless belt 90 driven in unison from shaft 80 in the direction indicated by the arrows in FIG. 2. Belt 88 is suspended between a drive roller 92 secured to shaft 80 and an idler roller 94 secured to shaft 76; and belt 90 is suspended between a drive roller 96 secured to shaft 80 and an idler roller 98 secured to shaft 76. The belts are preferably comprised of a composition material or rubber so that they have highly frictional surfaces. The belts serve to propel sheets, such as sheet 16, across the stacking area when the sheets are retained in contact therewith by the stacking bars. Although two belts are illustrated, it should be apparent that a conveyor including a single belt or a greater number of belts could be used as well.

As illustrated, one or more stacking bars 62 are suspended beneath the transfer conveyor at either end of the apparatus. The stacking bars extend completely across the stacking area generally indicated at 110. The stacking bars are each attached to a corresponding set or pair of drive chains for movement therewith along a generally orbital path in a manner explained hereinafter.

Referring particularly to FIGS. 2 and 3, a first pair of drive chains 116, 117 are illustrated spaced on one side of the conveyor, and a second set of drive chains 116', 117' of similar design are illustrated, spaced on the other side of the conveyor. Only chains 116, 117 are described herein, it being understood that like elements of chains 116', 117' are designated in the drawings by like primed numbers. The aforementioned chains are all endless, link type chains. Drive chain 116 is trained along a continuous, orbital path over a drive sprocket 119 and idler sprockets 120, 121. Chain 117 is trained along a corresponding path over a drive sprocket 129 and idler sprockets 130, 131.

The idler sprockets are each rotatably mounted on one of four short shafts 122 that are attached to the frame. Sprockets 119 and 129 are secured at the ends of a shaft 124 that extends across one end of the stacking area. Shaft 124 is rotatably supported in bearings 125, 126 that are attached to the legs of the framework. A drive motor 127 is provided having its shaft attached to one end of shaft 124 for rotating the shaft and driving chains 116, 117 in unison.

Referring now to FIGS. 4 and 5, each stacking bar 62 comprises an elongate member in the form of a pair of parallel side members 102, 104 connected at their ends by plates 106. The stacking bars are pivotably attached to the drive chains by pins 139 extending through holes formed in plates 106 and through corresponding holes in a side, such as side 140, of a link of the drive chain. Accordingly, the stacking bars are mounted for free pivotal movement along an axis parallel to the length of the bars.

Each bar further includes a plurality of rollers 108 disposed in a row therealong and rotatably mounted between the side members. Thus, each roller is journaled on a pin 109 extending between the side members for rotation about an axis extending transversely of the side members (and the lower runs of belts 88, 90). Pins 109 are positioned above the center line of the side members as illustrated in FIG. 4. Accordingly, the upper surface or side of each roller 108 extends above the upper edges of the side members as viewed in FIG. 4. Consequently, a sheet, such as sheet 16, positioned upon the stacking bar contacts only the roller surfaces and not the side members of the bar. Furthermore, since the stacking bar is pivotally attached to the chain links and the center of gravity of each stacking bar is below the point of attachment of the bar to the link, as illustrated in FIG. 4, each stacking bar is normally positioned by gravity with the exposed surfaces of its rollers 108 extending upwardly for contacting the sheets. These surfaces or sides define a plane along one side of a stacking bar and constitute sheet supporting means on this one side of the bar.

The stacking bars are mounted at corresponding positions on their respective chain sets for paired operation, i.e., when a stacking bar is located at its uppermost position on chains 116, 117, a corresponding stacking bar is located at its uppermost position on chains 116', 117'. In the embodiment illustrated, two stacking bars are provided on each side of the stack to double the sheet handling capacity of the apparatus. However, a single stacking bar could be provided on each side or a greater plurality than two.

The stacking apparatus otherwise includes a stop member 145 that is adapted to extend into the path of sheets 16. The stop member is an elongate plate suitably secured to the framework and normally suspended between the belts of the transfer conveyor at the downstream side of the stack. In that position, sheets handled by the conveyor engage the stop member and are held momentarily until they are lowered by dropping of the stacking bars. The stop member is adapted to be retracted, by means not illustrated, to permit sheets to pass by the stacking area if desired. Contact between the sheet and the stop member serves to actuate an electrical switch 146 positioned adjacent thereto that produces a signal used to control the drive chain motors.

A scissor lift 150 is located in stacking area 110, adapted to receive and support sheets in a stack 152. The scissor lift includes a conventional understructure adapted to support cross members 154, 156 having rollers 158 supported therebetween. Cross members 154 are fixed to the lift structure. However, cross members 156 are pivotally secured at one end to a shaft 160 fastened to a riser 162 of the lift structure with an outer end of each of cross members 156 being free. Accordingly, with the scissor lift in an elevated position, as illustrated in FIG. 3, cross members 154, 156 are oppositely inclined by a small angle. This results in a slight bend in the middle of the stack for a purpose explained hereinafter. However, upon lowering of the scissor apparatus until the rollers between cross members 154 are level with rollers 165 of an outfeed platform 166, cross members 156 contact the top of support member 170 on the right hand side of FIG. 3. This elevates the free end of cross members 156 and the end of the stack carried thereby. Accordingly, the stack is propelled by gravity to the left, as viewed in FIG. 3, onto the outfeed platform where the stack may be conveniently handled for shipment.

Stacking guides 148 are provided at either end of the stacking apparatus secured to the frame to align the ends of the sheets upon the stack as they are dropped.

Referring to FIGS. 1 and 3, a pair of channel members 175, 176 are provided adjacent the downstream side of the stack, being secured to the framework. The channel members extend downwardly and are adapted to contact the sides of the stack below the stop member 145. On the other side of the stack an impact bar 178 is provided, being pivotably mounted at its lower end to a cross member 180 secured to the framework. The outer end of a shaft 181 of an air ram 182 is pivotably secured to the mid-portion of bar 178. Upon operation of the air ram by a remote air source, bar 178 is pivoted into contact with the uppermost sheets of stack 152. Due to the stiffness imparted to the sheets in the stack by the bend therein, bar 178 serves to drive the sheets into contact with members 175, 176 and maintain the trimmed edges of the sheets in good alignment in the stack.

In the operation of the apparatus described, sheets, such as sheet 16 are sequentially received upon conveyor 14 from the veneer clipper and elevated to the upper end thereof. As the sheets are driven off the upper end of the elevator conveyor they come into contact with the bottom surface of transfer conveyor 60 and are received upon the upper surfaces of the rollers of bars 62 positioned at either end of the sheet. The position of chain pairs 116, 117 and 116', 117' is controlled whereby the stacking bars 62 are driven to their uppermost position prior to the entry of a sheet 16. The chain pairs are stopped with the stacking bars in this position whereby the sheet is retained in frictional contact with the belts of conveyor 60 until the sheet arrives over the stacking area. The arrival of the sheet at the stacking area is detected by contact between the leading edge of the sheet and stop member 145. At that time, switch 146 is actuated and the chain pairs are driven so that the stacking bars traverse a path from their uppermost position downwardly and outwardly with respect to the ends of the sheet. Since rollers 108 are journaled for rotation with respect to the stacking bars, and the roller bar remains in an upright position with respect to the sheets, the outward translation of the stacking bars does not result in scratching or other damage to the surface of the sheets. The stacking bars lower sheet 16 to a position just over the top of the stack and then are driven horizontally outwardly beyond the edge of the sheet. Accordingly, the sheet is permitted to drop a short distance onto the top of the stack. The stacking bars are then driven on around the orbital path until they reach a position that does not interfere with the entry of the next sheet.

The length of the chains is sufficient that just after one pair of stacking bars drops the first sheet, a second set of stacking bars is moved into position to support a second sheet, and stopped. A second stacking cycle can then be executed. Thus, the stacking bars are designed to handle alternate sheets projected up the elevator chain.

As the stack is gradually built on scissor lift 150, the lift is automatically lowered whereby the sheet is always dropped only a short distance onto the top of the stack. When the stack is completed to a desired height, the scissor lift is lowered further, as previously explained, whereby the stack is propelled outwardly onto platform 166.

It should be apparent that the stacking apparatus described hereinbefore is particularly advantageous since it permits the rapid and efficient stacking of flexible sheets with extremely compact equipment. Furthermore, the stacking operation is carried out without damage to the faces or edges of the sheets. Also the utilization of plural stacking bars at each end of the apparatus results in more rapid handling of the sheets than was heretofore possible with stacking apparatus of conventional design.

It is claimed and desired to secure by letters patent:

1. Sheet stacking apparatus comprising
   an endless conveyor arranged between a sheet infeed station and a sheet stacking area, said conveyor including a lower reach adapted for transferring sheets held in engagement therewith,
   means at said infeed station for moving selectively sheets to be stacked into engagement with said lower reach,
   elongate bar means supported beneath said lower reach of the conveyor substantially paralleling said reach and having sheet supporting means along one side thereof for engaging the bottom of one of said sheets adjacent an end thereof thus to retain said sheet in engagement with said lower reach, and
   a bar-moving means connected to each end of said bar means for withdrawing selectively said bar means along a portion of a continuous, orbital path downwardly and outwardly from the ends of said sheet to permit said sheet to drop in said stacking area and for moving said bar means along the rest of said path to reposition said bar means beneath said conveyor
   said bar means being freely pivotally connected at each of its ends to a bar-moving means whereby its said sheet supporting means is maintained facing upwardly during movement of the bar means along said orbital path.

2. The apparatus of claim 1, wherein said sheet supporting means of said bar means comprises plural roller surfaces disposed along said one side of the bar means defining a plane along said one side.

3. Sheet stacking apparatus comprising a frame, an endless conveyor supported on said frame between a sheet infeed station and a sheet stacking area, said endless conveyor including a movable lower reach adapted for moving sheets held in engagement therewith,
- infeed means for moving selectively sheets to be stacked into engagement with said lower reach for movement by said conveyor,
- a plurality of stacking bars for engaging selectively the bottom of each of said sheets, at least one stacking bar being provided on each side of said conveyor for each end of said sheets,
- each of said stacking bars comprising an elongate member having a plurality of rollers journaled thereon with sides facing upwardly and disposed above one side of said member in position to contact a sheet engaged by said stacking bar, and
- a continuing chain supported on said frame connected to each end of each of said stacking bars for moving selectively the stacking bar downwardly and outwardly with respect to the ends of the sheet engaged by said stacking bar to permit said sheet to drop into said stacking area
- said chain being connected to a stacking bar by a free pivot connection whereby said roller sides are maintained facing upwardly during movement of the bar by the chain.

* * * * *